United States Patent [19]

Glista, Jr.

[11] Patent Number: 5,020,152

[45] Date of Patent: * May 28, 1991

[54] FAULT TOLERANT-FIBER OPTIC COUPLER/REPEATER FOR USE IN HIGH SPEED DATA TRANSMISSION AND THE LIKE

[76] Inventor: Andrew S. Glista, Jr., 4126 Whispering La., Annandale, Va. 22003

[*] Notice: The portion of the term of this patent subsequent to Jun. 6, 2006 has been disclaimed.

[21] Appl. No.: 357,959

[22] Filed: May 30, 1989

Related U.S. Application Data

[63] Continuation of Ser. No. 45,469, May 4, 1987, Pat. No. 4,837,856.

[51] Int. Cl.$^5$ .............................................. H04B 10/14
[52] U.S. Cl. ..................... 455/601; 455/606; 370/1
[58] Field of Search ............... 455/600, 601, 602, 606, 455/607, 617, 612; 370/1

[56] References Cited

U.S. PATENT DOCUMENTS

| | | | |
|---|---|---|---|
| 4,039,953 | 8/1977 | Chadwick | 455/135 |
| 4,255,740 | 3/1981 | Ferrie | 455/135 |
| 4,317,229 | 2/1982 | Craig | 455/135 |
| 4,527,285 | 7/1985 | Kekas | 455/602 |
| 4,545,074 | 10/1985 | Balliet | 455/601 |
| 4,612,670 | 9/1986 | Henderson | 455/602 |
| 4,752,927 | 6/1988 | Melling | 370/16 |
| 4,834,483 | 5/1989 | Arthurs | 370/1 |
| 4,837,856 | 6/1989 | Glista | 455/606 |
| 4,866,704 | 9/1989 | Bergmann | 370/4 |
| 4,870,637 | 9/1989 | Follett | 370/4 |

FOREIGN PATENT DOCUMENTS 0047223 2/1987 Japan ..................... 455/135

Primary Examiner—Joseph A. Orsino
Assistant Examiner—L. Van Beek
Attorney, Agent, or Firm—Terry M. Gernstein

[57] ABSTRACT

A fault-tolerant fiber optic coupler/repeater for use in a terminal in a high speed digital, audio or video data transmission system has optical data input from one or a plurality of upstream terminals and sends optical data to one or a plurality of downstream terminals via fiber optic lines. The terminal includes one or more bypass lines and is connected to the bypass line of at least one upstream terminal. The terminal receives optical data signals from upstream terminals via a primary line and one or more bypass lines which bypass one or more of the upstream terminals. The terminal includes a logic device which analyzes the signals received by the terminal via the primary line and via the bypass line and analyzes or compares these signals to preset values. The logic device selects the signal having characteristics closest to the preset values and rejects the other signals. The logic device likewise activates a built-in test circuit if multiple signals are rejected for not having characteristics within a preset range, all of the data is rejected. The selected primary or bypass signal is sent to an input/output device, such as a computer.

7 Claims, 7 Drawing Sheets

FAULT TOLERANT-FIBER OPTIC COUPLER/REPEATER FOR USE IN HIGH SPEED DATA TRANSMISSION AND THE LIKE

This is a continuation of co-pending application Ser. No. 07/045,469 now U.S. Pat. No. 4,837,856 filed on May 4, 1987.

TECHNICAL FIELD

The present invention relates in general to data transmission systems in which a plurality of data terminals (N greater than 16) are interconnected by optical fiber transmission links, and relates more particularly to such a data transmission system for use in high speed, digital, audio or video data transmission.

BACKGROUND ART

Optical data fiber transmission (e.g., high speed data bus, high speed computer interconnect, local area networks (LAN), etc) has been limited by the availability of a fail-safe multiport optical coupler/repeater. Presently available LAN/data bus concepts have considered various optical energy distribution devices which can be categorized as: (a) passive power splitters (such as fused/biconical couplers) and (b) star couplers (reflective or transmissive) and (c) active repeaters. The devices falling into catagories (a) and (b) have the advantage of being completely passive, however, the state-of-the-art of available power launched into an optical fiber, receiver sensitivity and dynamic range, and connector, coupler and fiber loss limits the utility of these devices for multiterminal Local Area Networks.

The devices in category (c), active repeaters, lend themselves to high speed multichannel (N greater than 16) linear or ring network topologies, but the integrity of the network is limited by a single point failure in the fiber or a component or power supply in the active repeater.

A fail-safe switch in the data bus terminal has been used to overcome the last-mentioned problem. Such fail-safe switches have been mechanically or electrooptically actuated switches, and have the drawback of complicating the timing, the synchronization schemes, and/or the signal-to-noise ratio of the overall network. Furthermore, these switches may limit data bus or pipeline speeds as they are slow. Still further, mechanical switches or active repeaters may have a tendency to fail in an "on" mode, thereby swamping a downstream terminal, and are somewhat susceptible to vibration and other such mechanical interference. This last drawback may limit the acceptability of such switches in applications, such as military, where such failures may be totally unacceptable.

Presently available fail-safe switches cannot accommodate faults, such as a failure in an upstream port in a manner which is both rapid enough for modern technology and which is also rapid and energy-efficient. The mechanical devices are simply not fast enough for modern applications, and still are susceptible to failure-inducing conditions as above discussed. While electro-optical devices may be faster than the mechanical devices, these switches suffer the drawback that they severely limit the distance between stations because they are quite lossy. Often, such switches are active and thus require power for operation, thereby presenting several drawbacks.

A further problem with presently available fail-safe switches used in such systems is that they are not capable of accommodating the "stuck-on" condition of an upstream terminal. As mentioned above, the mechanical switches are susceptible to failure in the "stuck-on" condition. Thus, should an upstream terminal fail in the stuck-on mode, presently available fail-safe switches may not be able to accommodate such a condition since many of these switches are set up to determine only if the data being sent to a terminal is "good" and not if there is a swamping condition present in which too much "good" data is being sent to the terminal.

Some presently available terminals have attempted to overcome these problems by providing a fault-detection system within the terminal that samples the signal from one of several redundant receiver/transmitter units within that terminal and then uses the most acceptable signal. Such fault detector systems, while serving to overcome the signal problem at each terminal are often active thereby requiring additional backup power and may also be expensive. Still further, such fault-detection systems make no provision for a total failure of the particular terminal. That is, if the terminal suffers a total failure, all downstream terminals are affected.

Therefore, there is need of a fault-tolerant coupler/repeater for use in high speed optical fiber data transmission systems which is fast enough and which is reliable enough for modern needs, yet which is not unduly lossy or expensive in nature.

OBJECTS

It is a main object of the present invention to provide a fail-safe data bus terminal which allows multiterminal optical fiber distribution without the disadvantages of the presently available devices.

It is another object of the present invention to provide a fail-safe switch which is capable of discriminating between signals and using the best signal for an associated data bus terminal.

It is another object of the present invention to provide a fault-tolerant terminal which includes logic for discriminating between incoming signals.

It is another object of the present invention to provide a fail-safe data bus terminal which has means for providing totally redundant data lines.

It is another object of the present invention to reduce noise in a terminal.

SUMMARY OF THE INVENTION

These and other objects are accomplished by a terminal which includes multiple detectors and logic circuitry for determining power in two or more input lines connected to that terminal. The logic circuitry determines the ratio of optical power in the lines or the average power in either line to determine if it is proper, and does not require conversion of an optical signal to an electrical signal to achieve fault tolerance if the ratio or average power is improper. An optical logic device may also be utilized to determine the power ratio in the lines.

The logic circuitry is preset so that if power in any of the input lines is outside of a preset range as determined by optical power ratio in the lines or average power in either line, the data from another line is selected for use in the terminal. Thus, if the power in a particular input line is too low due to the failure or degradation of an LED, laser, electrical component or fiber, or too high due to a stuck-on failure in a previous terminal, the data in that line will be rejected and not used in that terminal. The logic circuitry is also arranged so that, if several of the data signals being input to the terminal are unacceptable, these signals will be rejected and signals from the last working terminal will be sent on past the terminal via a bypass line. On the other hand, if all of the input data signals are acceptable, the logic circuitry is arranged to use the "best" one of these signals or the sum of all the optical signals if identical. That is, the signal or sum of the signals that is closest to the optimum signal will be selected, and the rest of the signals will be rejected. In the case of a power failure, the bypass enables a signal to reach the succeeding terminal by totally passive means. In addition to power monitoring, suitable photodiodes and logic can likewise be utilized to monitor optical wavelength or polorization for fault detection.

DETAILED DESCRIPTION OF A PREFERRED EMBODIMENT

Figure 1:
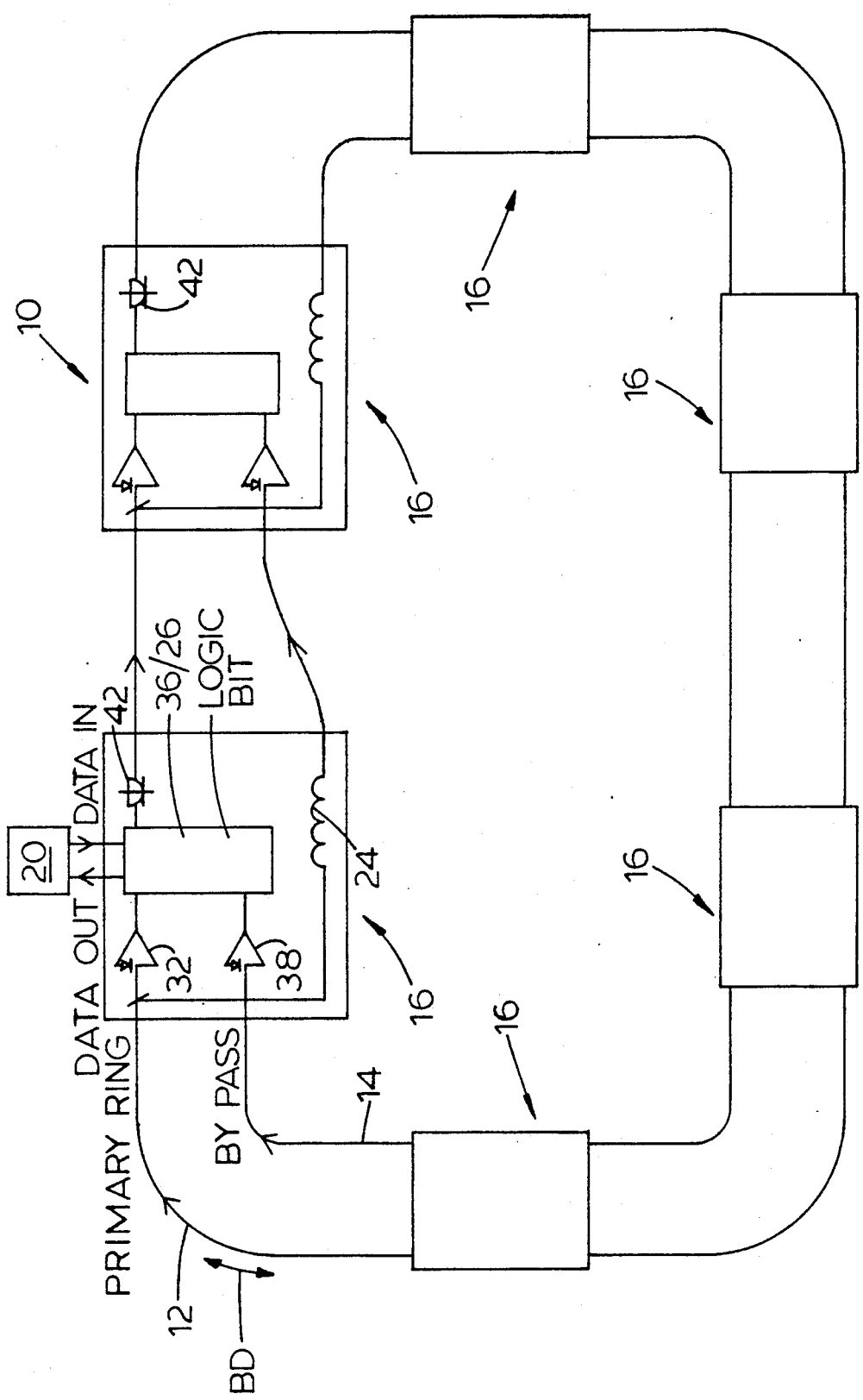
FIG. 1 is a schematic of a ring bus data transmission system in which the terminal embodying the teaching of the present invention is used.

Shown in FIG. 1 is a high speed data transmission system 10 which is in the form of a ring bus and uses fiber optic lines 12 and 14 to transmit data between N terminals 16. In the system 10, line 12 is the primary ring and line 14 is a bypass ring. The lines 12 and 14 are totally redundant and separate whereby a totally redundant data transmission system is formed. Each of the N terminals 16 uses data in the usual manner, and includes the usual data input/output mechanisms and devices 20, such as a computer or the like.

Each terminal 16 includes connection means to which the lines 12 and 14 are connected, and can be a unitary element formed of components embedded in a substrate as will be discussed below. There are N terminal with the data transmission direction proceeding from terminal (N−1) to terminal N to terminal (N+1) in the downstream direction.

Figure 2:
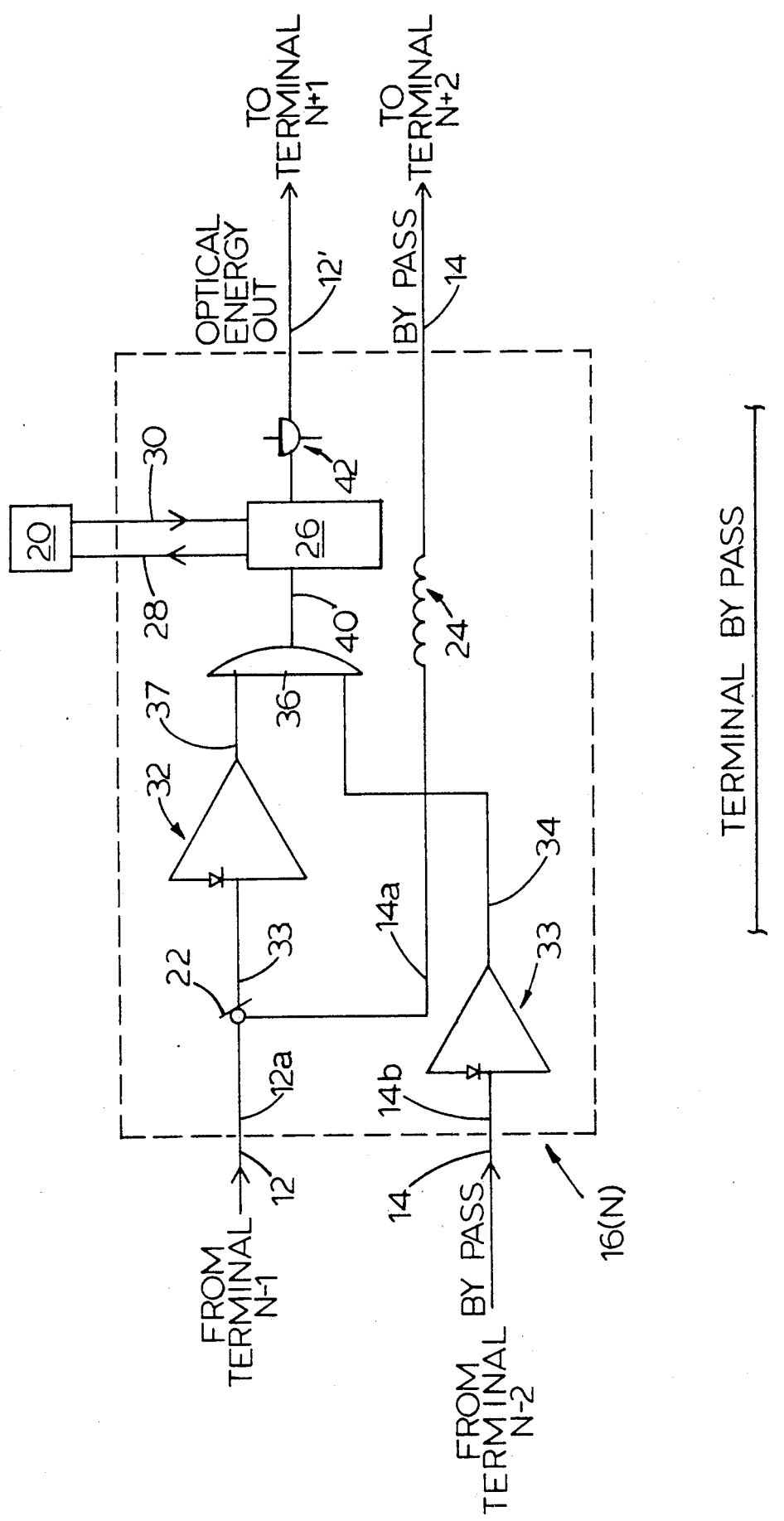
FIG. 2 is a schematic of a data terminal of the FIG. 1 ring bus system.

A terminal 16 is best shown in FIG. 2 and attention is now directed thereto. The terminal shown in FIG. 2 is the Nth terminal, and has data input from terminal (N−1) via the optical fiber of primary ring 12 and from terminal (N−2) via the optical line in bypass ring 14. Data is then transmitted to terminal (N+1) via primary ring optical line 12' and to terminal (N+2) via bypass ring optical fiber line 14. A power splitting device, such as fusion coupler 22, is coupled to the primary line 12 by a coupling line and means 12a and couples that primary line 12 to a bypass coupling line and means 14a which is coupled to the bypass ring optical fiber line 14 for the purpose of having a signal bypass the terminal. The coupler, or couplers, can be located outside the terminal to avoid single point failure, if required.

A delay means 24 can be positioned in the line and means 14a if desired. The fusion coupling 22 and the delay means 24 are known per se, and thus will not be discussed, it being mentioned only that the coupling can be arranged to divide the data into any desired ratio, and the delay means can be arranged to introduce any desired delay into the data signal being transmitted on the bypass line from terminal N to any other terminal. Data from an upstream terminal which is not adjacent to the instant terminal (e.g., the (N−2) terminal) on the bypass line 14 is coupled to the terminal via bypass coupling and means 14b.

The input/output mechanism and/or device 20 receives and sends data from and to a filter or signal shaping circuits 26 or like mechanism or device via input use line 28 and output use line 30. This portion of the terminal can be any suitable element or combination of elements, and will not be discussed further.

Data on the primary line 12 is transmitted from the fusion coupling to a photo diode 32 via a line 33 and from such photo diode to a logic circuit 36 via line 37. Data on the bypass line 14 is transmitted from terminal (N−2) via the means 14b to a photo diode 38 and then via line 39 to the logic circuit 36. The logic circuit 36 determines which of the data signals from either line 12 or from line 14 is to be used by the terminal N and passes that signal on to the filter 26 via data line 40 for use by the input/output mechanism 20. An optical source 42 is positioned in the primary line 12' to transmit output from the terminal N or boost signal from terminal (N−1).

The logic circuit 36 receives the primary signal from terminal (N−1) via the photo diode 32 and the by pass signal from another terminal, such as terminal (N−2), via photo diode 38, analyzes those two signals, rejects the signal having a power which is out of preset ratio and uses the other signal for the terminal N. In this manner, a weak signal, an interrupted signal, or even a signal which is too powerful, can be rejected and will not be passed on for use by the device associated with the terminal N. Only a signal having a desired (instantaeous or average) power will be used. The logic circuit 36 can be set to select the signal to be used by the terminal N according to any standard, such as instantaneous or average power, range, noise, spectral content or the like. Only data signals having the desired characteristics will be used and all others will be rejected by the logic circuit 36. Furthermore, the logic circuit 36 is arranged to reject several of the input signals if none of these signals fall within the preset range. Still further, the logic circuit 36 is also arranged to use the signal that is closest to a preset optimum if all of the signals are otherwise acceptable. If multiple signals from previous terminals are rejected, these terminals are, in essence, shut down, and the logic circuit can include some means for transmitting a Built-In-Test signal telling any or all downstream terminals of the failure. The remaining bypass line or lines can then be used for keeping the ring intact.

Figure 3:
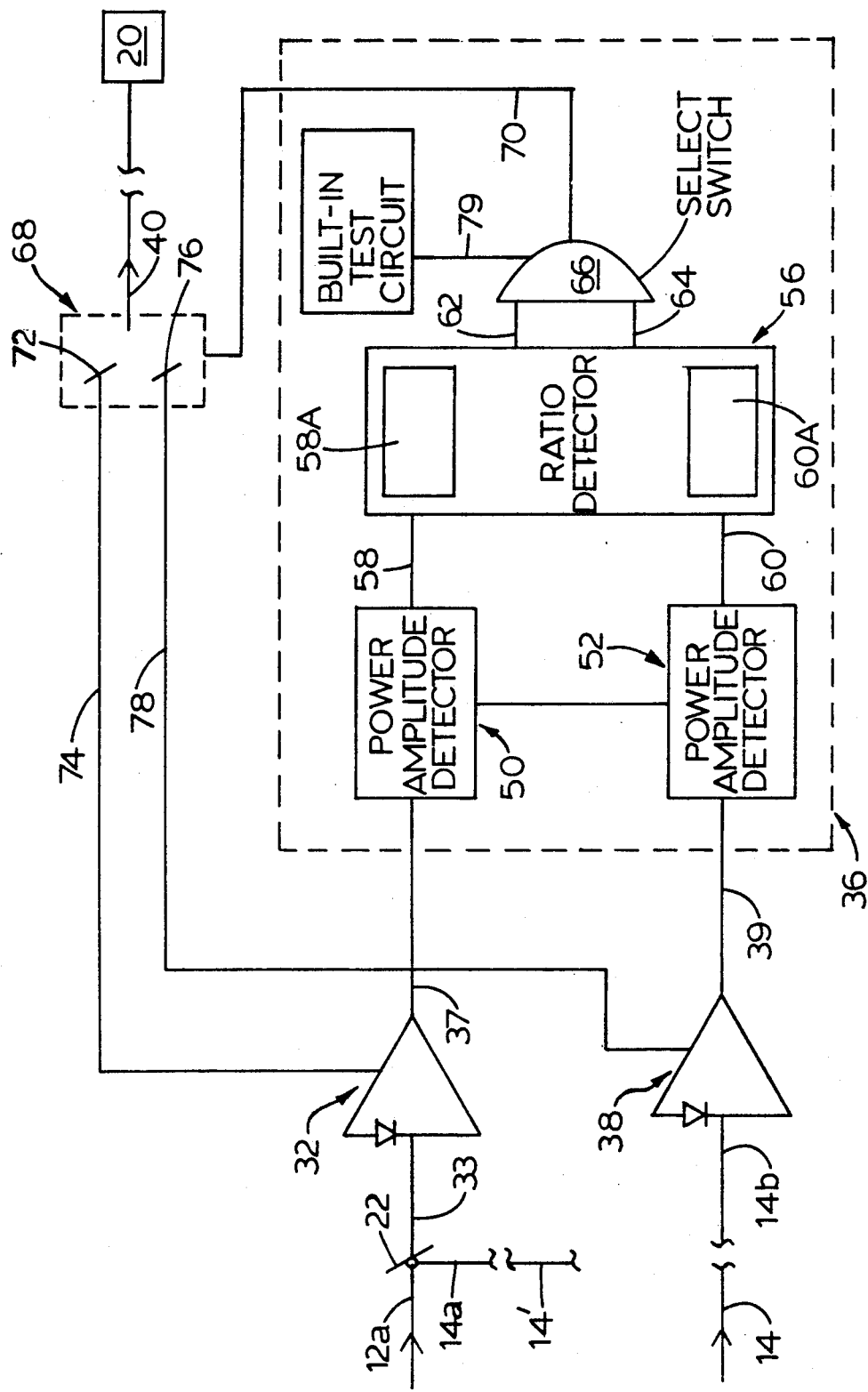
FIG. 3 is a schematic of the logic circuitry used in the terminal of the present invention.
Figure 4:
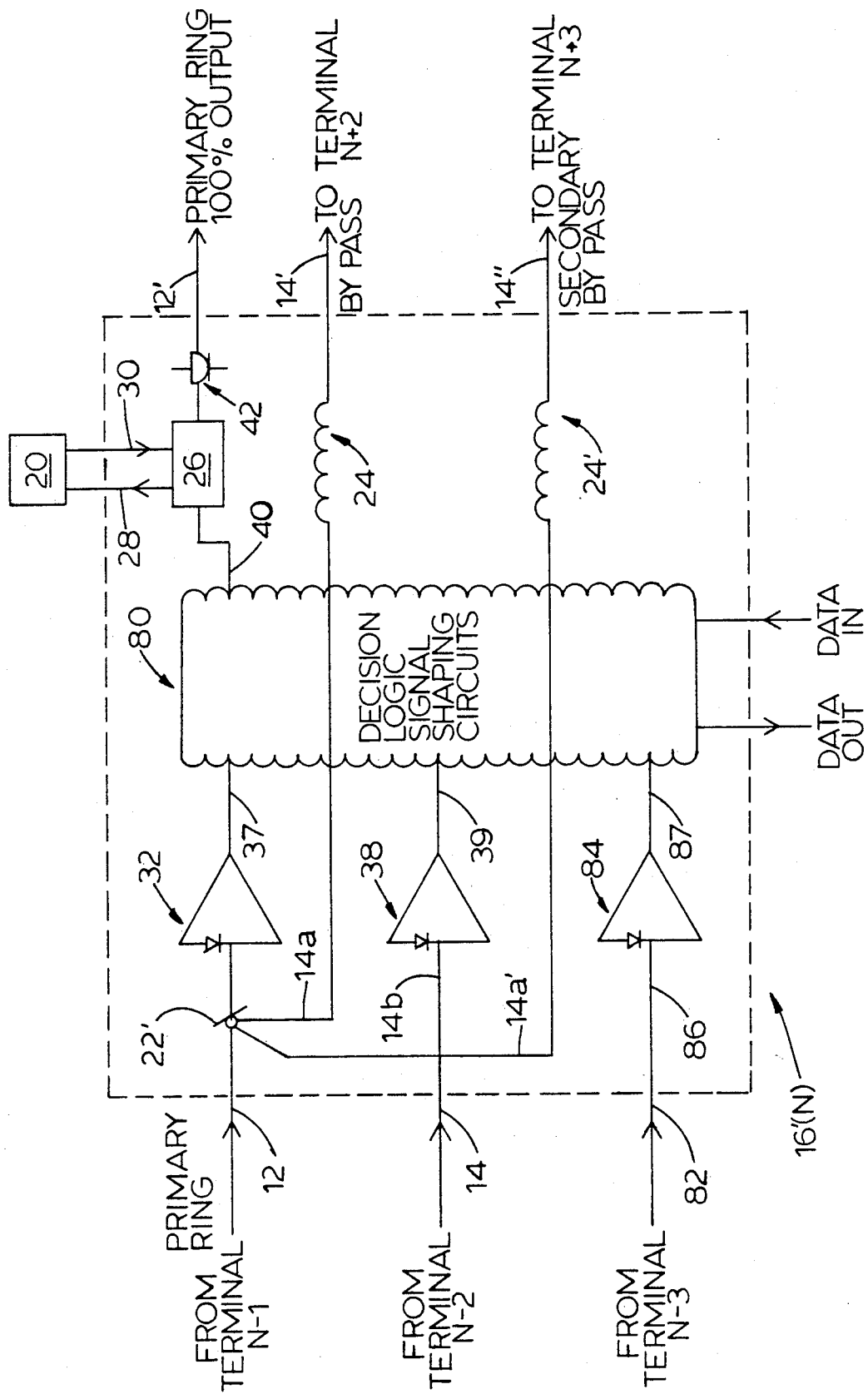
FIG. 4 is a schematic of a terminal in a data transmission system using at least three input lines.

The logic circuit 36 is best shown in FIG. 3, and attention is now directed to that figure. As discussed above, data line 40 is connected to the input/output device 20 associated with the terminal N via a filter, signal shaping circuit or other such equipment as necessary and data to be used by that mechanism is transmitted thereto over line 40. The data to be placed on line 40 comes either from the primary line 12 via line 33 or from bypass line 14 via line 14b depending on the instantaneous or average power, noise etc in these signals. The logic circuit 36 chooses the more desirable data signal and rejects the other, or several if necessary, as is the case in multiple bypass systems (see FIG. 4).

To accomplish this result, the logic circuit includes power detector circuits 50 and 52 connected to photo diodes 32 and 38 respectively via lines 37 and 39 respectively. These circuits measure the instantaneous amplitude of the light or integrated average power of the light. A suitable optical device can also be used for this purpose thereby avoiding the problems associated with translation of optical to electrical signals. The results of these analyses are fed to a power ratio detector 56 along lines 58 and 60. The power ratio detector 56 is preset proportional to the power division ratio in the coupler of the N−1 terminal and selects the proper data signal and, using either line 62 or 64, which will actuate logic select device 66 accordingly. The logic select device 66 controls a switch mechanism 68 via line 70. Power integrating pulse accumulation circuits (such as 58A or 60A) can be used to determine average power on the line and can detect an LED or lasar which is "stuck-on" in a previous terminal. This circuit will also activate the logic select means. The switch mechanism 68 includes a switch 72 connected to the photo diode 32 by a line 74 and a switch 76 connected to the photo diode 38 by a line 78. The logic circuit can also include a built in test circuit connected to the select device 66 by a line 79 to be actuated in the event one of the data lines contains a data signal with undesirable characteristics. The built in test circuit can include a suitable visual and/or audible alarm to signal that a data signal on one or more of the data lines coming into the terminal has undesirable characteristics. The visual signal can include data as appropriate.

The switch select device 66 actuates either switch 72 in line 74 connected to the primary input line 12 or switch 76 in line 78 connected to the bypass line 14 to pass the data in such selected line to the input/output device via line 40. The logic circuit is shown as using power as the test for which data input line to use, but other indicia can be used as well. It is also noted that the dotted outline OL shown in FIG. 3 can also represent a monolithic chip incorporating the various elements of the circuit.

While the FIG. 3 logic circuit is shown as being used in conjunction with two input lines, three or more data input lines can be used. This situation is indicated schematically in FIG. 4. A logic circuit 80 is associated with terminal 16' of a plurality of terminals 16' and receives data from terminal (N−1) via the primary data line 12, from terminal (N−2) via bypass line 14, and from terminal (N−3) via a secondary bypass line 82. The logic circuit 80 samples those data and uses the data having the desired characteristics while rejecting the rest as above described in conjunction with the description of logic circuit 36. Accordingly, in addition to photo diodes 32 and 38, the terminal 16' includes a photo diode 84 connected to the secondary bypass line 82 by an input connection and means 86 and to the logic circuit 80 by a line 87. The logic circuit 80 samples the data from the photo diodes 32, 38 and 84, analyzes that data for the selected parameter, and selects the data having the desired characteristics while rejecting the other data. The selected data is transmitted to the device 20 via line 40 in the manner described above in regard to the logic circuit 36.

Since the terminal 16' is associated with three downstream terminals (N+1), (N+2) and (N+3) as well as with three upstream terminals (N−1), (N−2) and (N−3), the terminal 16' includes an additional bypass line 14a' connected to a fusion coupler 22', and, optionally, includes a delay means 24'. In the manner of terminal 16, terminal 16' can include a repeater 42 in the primary ring data line 12'.

As can be seen from this disclosure, a terminal N can be associated with any number of upstream terminals and/or with any number of downstream terminals and/or any combination thereof depending on the level of redundancy or fault tolerance required in the network. The device also can be used in conjunction with a bidirectional primary line or primary optical fiber as indicated in FIG. 1 y double-headed arrow BD. The logic circuit associated with each terminal can be programmed to accept and reject data from any of the upstream terminals based on any selected reference and to pass data on to any downstream terminal based on a selected criterion. In fact, a terminal N can be associated with selected ones of the upstream terminals (e.g., with terminals (N−1), (N−2), (N−4), (N−6) and so forth) and/or with selected ones of the downstream terminals (e.g., with terminals (N+1), (N+3), (N+5) and so forth), and there need not be a one-to-one or even any systematic, correspondence between terminals.

Figure 5:
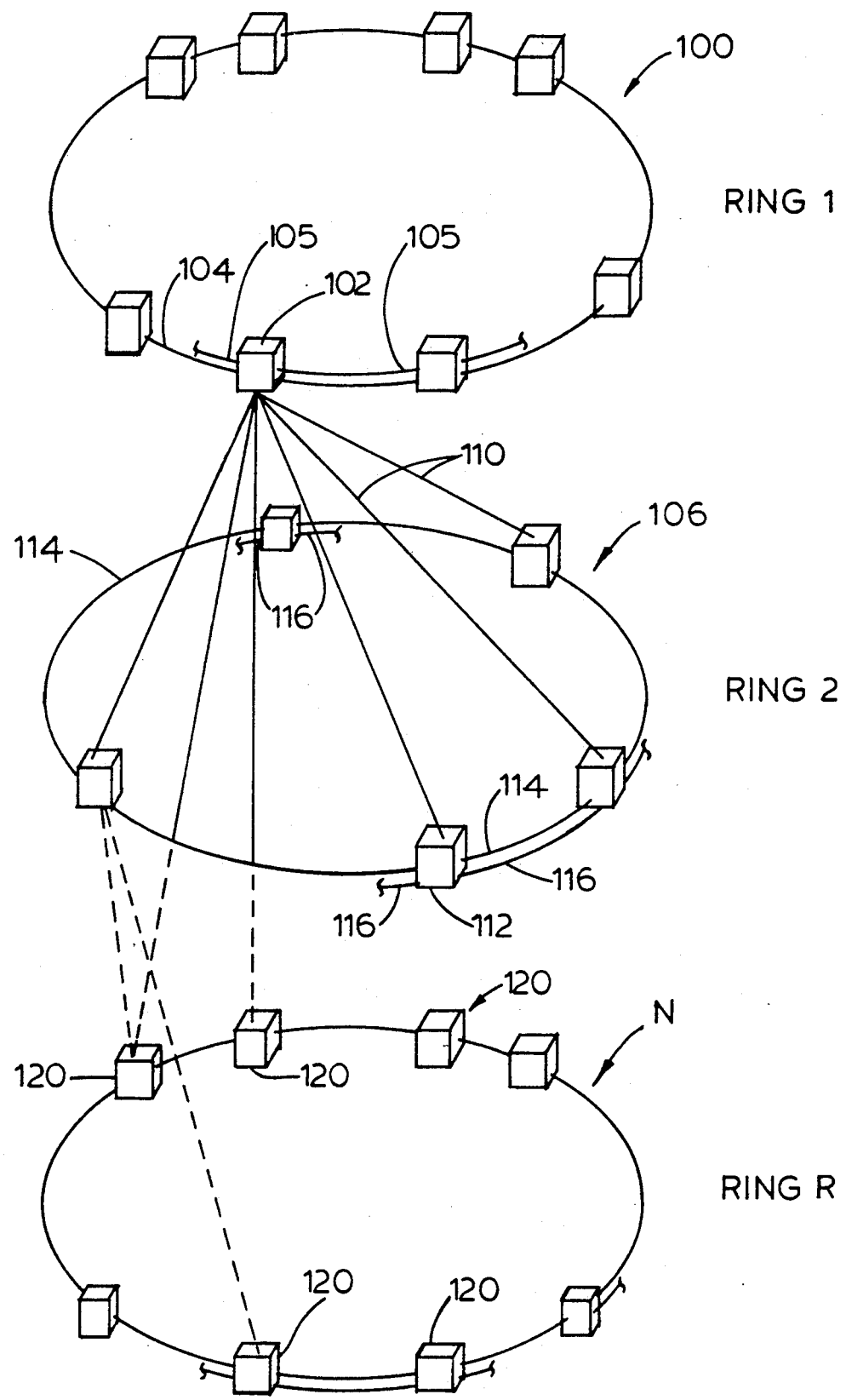
FIG. 5 is a schematic of a branched tree data transmission system.

Because the logic circuit of each terminal is so adaptable, it is ideally suited for use in a star-coupling arrangement. Such an arrangement is illustrated schematically in FIG. 5 in which a ring 100 includes N terminals 102 coupled to each other via a line 104 and can include one or more bypass lines, such as bypass line 105 in the manner discussed above. However, ring 100 is also coupled to other rings, such as ring 106 via the terminals and lines, such as line 110 connecting the terminal 102 to any or all of the terminals, such as terminal 112 of the ring 106. The terminals 112 of the ring 106 can be interconnected with each other via a primary line 114 and a bypass line 116 as discussed above. In this manner, each terminal of each ring can be interconnected to any or all of the terminals in all other rings of the configuration. This situation is illustrated in FIG. 5 by ring R having terminals 120 connected to each other and to each or any of the terminals in each or any of the other rings of the configuration. The logic circuits associated with each ring can be adapted to discriminate and use the most desirable data for the associated terminal based on parameters unique to the ring, if suitable, or the test parameters can be similar for all rings, if desirable.

Figure 6:
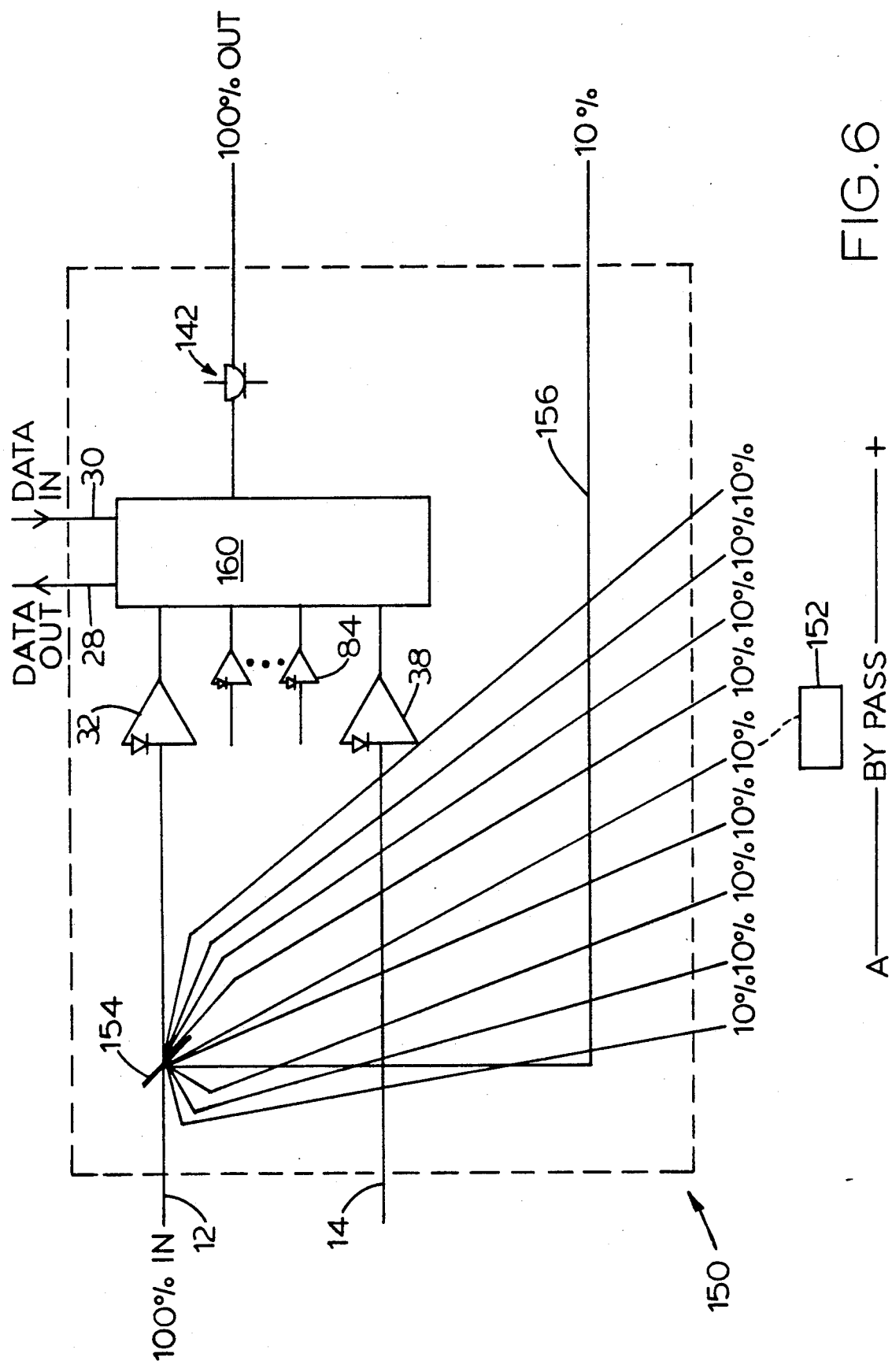
FIG. 6 is a schematic of one terminal of the FIG. 5 data transmission system.

The logic circuit associated with each terminal can be set to accept or reject data having any power level. Thus, if the power of any signal is decreased due to the just-described coupling, the downstream-located logic circuits can be adjusted accordingly. Such a situation is illustrated in FIG. 6 where one terminal 150 is connected with nine other terminals, such as terminal 152 via a fusion coupler 154 and has one bypass line 156. The terminal 150 can include any number of bypass lines and can be associated with any number of other terminals, and the FIG. 6 configuration is shown only for the purpose of illustration, and is not intended as being limiting. Each of the terminals will include a logic circuit, such as logic circuit 160 of the terminal 150, connected to the other terminals as described above and adjusted accordingly to receive data from photodiodes in each of the lines connected to the terminal, such as photodiodes 32, 38 and 84.

Figure 8:
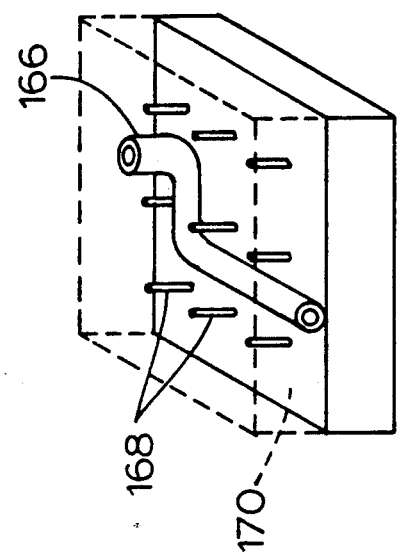
FIG. 8 is a schematic of another embedded system.
Figure 9:
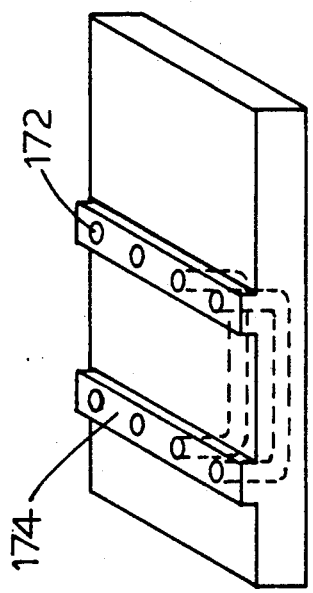
FIG. 9 is a schematic of a modular system with means for connecting other optical or electrical modules thereto.
Figure 7:
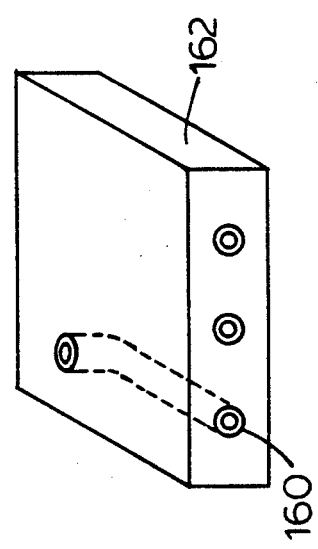
FIG. 7 is a schematic of an embedded system.

An application of the above-described system can be found in distributing data in an optical format between a computer or signal processor elements or modules. As discussed above, the system can be embedded on a substrate and can be used in modular form. Such modular form is indicated in FIGS. 7-9. These figures do not include all of the elements, but only the optical fibers and the elements not mentioned above in the interest of clarity. However, those skilled in the art will be able to include the necessary elements in such modular configurations based on the above disclosure.

The module will include an optical backplane which includes optical fibers 160 which can be either multimode or single mode and which are embedded in a panel 162 formed of composite, ceramic or other such material to form a monolithic structure.

FIG. 8 shows an embodiment which includes a wire wrap system with optical fibers 166 interspaced between pins 168 with a flowed-on polymer on polymer or organic filler back fill 170 to provide a monolithic backplane.

FIG. 9 shows the system as including a connector system so optical as well as electrical signals can be interfaced in a single module. In this manner, power, signals, and/or ground can all be interconnected to the module. Guide pins 172 can also be included as well as means 174 for connecting electronic modules to the optical modules.

The above description of the invention is intended to be illustrative only and is not intended to limit the scope of the invention as defined in the appended claims. Any variation as will occur to one skilled in the art based on the above disclosure is intended to be included in the scope of these claims.

I claim:

1. A fault-tolerant fiber optic coupler/repeater for use in high speed data transmission, data bus and high speed parallel processors and computers, comprising:
   a terminal;
   a primary input optical fiber connected to said terminal for conducting a primary optical signal to said terminal;
   a bypass optical fiber connected to said terminal for conducting a bypass optical signal to said terminal;
   a data input/output device connected to said terminal; and
   coupling means for coupling said primary input optical fiber, said bypass optical fiber and said data input/output device together, said coupling means including a power splitting device connected to said primary input fiber and to said bypass optical fibers and causing a signal to move from said primary input optical fiber to said input/output device or to move from said primary input optical fiber to said bypass optical fiber so that said signal will bypass said terminal on said bypass optical fiber, said coupling means including
   a primary input photodiode in said primary input optical fiber,
   a bypass photodiode in said bypass optical fiber, and
   a logic means connecting said primary input photodiode and bypass photodiode to said data input/output device for determining which of said primary or said bypass optical signals to send to said data input/output device for use thereby and which of said optical signals to reject, said logic means including a first power amplitude detector connected to said primary input photodiode to receive optical signals therefrom and to generate a signal, a second power amplitude detector connected to said bypass photodiode to receive optical signals therefrom and to generate a signal, a ratio detector connected to both of said power amplitude detectors for receiving signals therefrom and for comparing the power in each of the primary and bypass optical signals to a preselected power range and for selecting the optical signal which is closer to the preselected power range and rejecting the other optical signal and for generating a ratio detector signal, a select switch connected to said ratio detector to receive the ratio detector signal therefrom and which generates a switching signal corresponding to the selected optical signal, and a switch device connected to said select switch to receive said switching signal from said select switch, said switch device including a first switch connected to said primary input photodiode and a second switch connected to said bypass photodiode, a coupling means connected to said data input/output means for connecting either said primary input photodiode to said data input/output device or said bypass photodiode to said data input/output device depending on said switching signal for passing the selected optical signal to said data input/output device via either the primary input photo diode or via the bypass photodiode depending on which of the primary input or the bypass photodiodes has an optical signal which has power characteristics closer to said preselected range stored in said ratio detector.

2. A fault-tolerant fiber optic coupler/repeater system for use in high speed data transmission, data buss and high speed parallel processors and computers consisting only of a plurality of fault-tolerant fiber optic coupler/repeater means as defined in claim 1 connected together by fiber optic links and connectors.

3. The coupler/repeater defined in claim 1 wherein said primary input optical fiber is part of a primary ring.

4. The coupler/repeater defined in claim 3 wherein said primary input optical fiber is bidirectional.

5. The coupler/repeater defined in claim 3 wherein said bypass optical fiber is bidirectional.

6. A method for selecting data signals to be used by an input/output device in a terminal in a high speed parallel transmission system having a data bus and high speed parallel processors and computers comprising: inputting a primary optical data signal to the terminal via a primary optical fiber; inputting a bypass optical data signal to the terminal via a bypass optical fiber; splitting the primary optical data signal into a first signal and a bypass signal which bypasses the terminal; analyzing said primary optical data signal and determining the power of said primary optical data signal; analyzing said bypass optical data signal and determining the power of said bypass optical data signal; comparing the powers of said primary optical data signal and said bypass optical data signal to a preset range; selecting the primary optical data signal or the bypass optical data signal having a power closer to the preset range; sending the selected optical signal to the input/output device connected to the terminal; and sending optical signals to a next adjacent terminal via said optical bypass fiber.

7. The method defined in claim 6 further including a step of inputting a plurality of signals to the terminal.

* * * * *